United States Patent [19]
Mayer et al.

[11] Patent Number: 5,996,549
[45] Date of Patent: Dec. 7, 1999

[54] INLET ARRANGEMENT FOR AN INTERNAL COMBUSTION ENGINE

[75] Inventors: Thomas E Mayer, Glessen; Patrick Phlips, Cologne; Klemens Grieser, Langenfeld; Heinrich Z Krzykowski, Herdecke, all of Germany

[73] Assignee: Ford Global Technologies, Inc., Dearborn, Mich.

[21] Appl. No.: 09/165,328

[22] Filed: Oct. 1, 1998

[30] Foreign Application Priority Data

Jan. 10, 1997 [DE] Germany ............ 197 43 419

[51] Int. Cl.$^6$ .................. F02D 9/10; F02B 31/08
[52] U.S. Cl. .................. 123/306; 123/336; 123/337
[58] Field of Search .................. 123/306, 336, 123/337, 432, 308

[56] References Cited

U.S. PATENT DOCUMENTS

| | | | |
|---|---|---|---|
| 5,063,899 | 11/1991 | Hitomi et al. | 123/336 |
| 5,273,014 | 12/1993 | Mitobe et al. | 123/336 |
| 5,640,941 | 6/1997 | Hazen et al. | 123/306 |
| 5,718,198 | 2/1998 | Adamisin et al. | 123/308 |
| 5,720,255 | 2/1998 | Yoshikawa | 123/337 |
| 5,806,484 | 9/1998 | Yoneyama et al. | 123/308 |

FOREIGN PATENT DOCUMENTS

| | | |
|---|---|---|
| 2569227 A1 | 2/1986 | France . |
| 33 16 962 A1 | 11/1983 | Germany . |
| 36 38 021 A1 | 5/1987 | Germany . |
| 44 37 279 A1 | 4/1995 | Germany . |
| 195 34 770 C2 | 3/1996 | Germany . |
| 195 11 136 A1 | 5/1996 | Germany . |
| 5-133233 | 5/1993 | Japan . |
| 6-81665 | 3/1994 | Japan . |
| 07 174 028 | 7/1995 | Japan . |
| 07 180 559 | 7/1995 | Japan . |
| 07 208 524 | 8/1995 | Japan . |
| 07 288 184 | 10/1995 | Japan . |

Primary Examiner—Willis R. Wolfe
Assistant Examiner—Hieu T. Vo
Attorney, Agent, or Firm—Jerome R. Drouillard

[57] ABSTRACT

An inlet arrangement is provided for a multi-cylinder internal combustion engine. Each cylinder has an air inlet passage and a pair of inlet valves. A control flap is disposed within the inlet passage of one of the cylinders, the flap being pivotable about a pivot axle. The axle is disposed transverse to the length of the inlet passage. The flap has an operative position in which swirling of the air occurs and a starting position. The flap has a pair of wings provided on opposite sides of the pivot axle. The control flap has a base profile substantially corresponding to the internal profile of the inlet passage and a base area. One of the wings has a greater base area than the second of the wings. The first wing has a recess adjacent to the outer circumference of the wing. The recess, in the starting position of the control flap, faces away from direction from which the air flows.

13 Claims, 1 Drawing Sheet

INLET ARRANGEMENT FOR AN INTERNAL COMBUSTION ENGINE

FIELD OF THE INVENTION

The present invention relates to an inlet arrangement of a multi-cylinder internal combustion engine wherein each cylinder has an associated inlet passage which opens into at least two respective inlet valves for intake of an air/fuel mixture into the respective cylinder, and within the inlet passage of at least one cylinder there is a control flap which is pivotable about a pivot axle disposed transverse to the length of the inlet passage between an operative position in which swirling of the air/fuel mixture occurs and a starting position and has wings extending on either side of the pivot axle.

BACKGROUND AND PRIOR ART

The use of such control flaps to influence the flow characteristics in the inlet passage of an internal combustion engine is known. In the operative position swirling or turbulence is produced in the flow of the air/fuel mixture, which propagates through the inlet valves into the combustion chamber, where it leads to more efficient and more stable combustion, since through the swirling the atomisation of the fuel is improved and the speed of propagation of the flame front during the combustion process is increased. A particular result produced thereby is more stable combustion at lean air/fuel ratios. By the use of such a control flap valve, the proportion of fuel in a lean-burn engine mixture can be reduced without resulting in combustion instabilities such as, for example, misfires. This is desirable from the point of view of lowering the crude nitrogen oxide emissions, since generally leaner engine operations yield lower crude nitrogen oxide emissions.

However, in its operative position the control flap has a relatively high flow resistance. Consequently flow losses occur, restricting the maximum air/fuel throughput into the cylinders. Rather than using devices which are fixedly installed in the inlet passage for the production of turbulence, it is known to use control flaps which are variable and at higher engine speed/torque demands can be moved from the operative into the starting position at the instigation of the engine control unit in order to produce unimpeded air throughput and thus maximum volumetric efficiency of the internal combustion engine. A further effect of the reduced swirling in the starting position is to influence the spark duration and thereby affect the combustion noise.

In designing the shape of the control flaps, it is sought on the one hand to obtain the best possible swirl in the operative position, while on the other hand in the starting position the flow should be impeded as little as possible, since any additional resistance to flow reduces the available performance of the engine at full load.

Accordingly, it would be desirable to provide an inlet arrangement of the kind referred to above having control flaps such that, when they are in use, optimum swirling is produced in the operative position and minimum effect on the flow in the starting position.

SUMMARY OF THE INVENTION

To this end, in accordance with the invention in an inlet arrangement of the kind referred to, the base profile of the control flap substantially corresponds to the internal profile of the inlet passage. The wings of the control flap have different base areas; the wing with the greater base area has a recess adjacent to its outer circumference (which in the starting position of the control flap faces away from the direction from which the air/fuel mixture flows); and the wings have a cross-sectional profile which narrows toward the wingtips.

By "base profile", it is understood the profile of the control flap is described without taking account the recess. Because the base profile of the control flap substantially corresponds to the internal profile of the inlet passage, in the operative position of the control flap, the inlet passage is substantially closed apart from the recess. To prevent the control flap sticking in the operative position, an air gap can be left between the rim of the control flap and the inner rim of the inlet passage.

The base areas of the wings are understood as being the areas of the wings on the two sides of the pivot axle, without subtraction of the area of the recess. Because the wings have different base areas, the pivot axle runs through the control flap asymmetrically.

Because the wing with the larger base area has a recess, which in the starting position faces away from the direction from which the air/fuel mixture is flowing, and because the wings have a cross-sectional profile which narrows towards the wingtips, a control flap profile is created which in the starting position is particularly favourable for flow. Seen from the upstream side, the cross-section of the control flap increases over a short distance to reach its maximum value in the region of the pivot axle. The cross-section then becomes narrower over the remaining length. The result is an asymmetric "drop-shaped" profile which permits a largely laminar flow and in the starting position of the flap avoids undesirable swirl formation at the rear (in the direction of flow) edges of the recess.

In the operative position, on the other hand, a strong swirl is obtained through the recess adjacent to the outer circumference of the wing with the larger base area.

In an advantageous embodiment of the invention the area of the recess amounts to about 33% of the base area of the control flap. It has been found that with these proportions of the recess, an optimum compromise is obtained between the swirl formation sought to be achieved, which tends to be better with smaller recesses, and undesirable resistances to flow, which tend to be less with larger recesses.

According to a further aspect of the invention, the contour of the recess in the control flap runs in the direction of the pivot axle in a first section and transverse to the pivot axle in a second section. Such a right-angled shape of the recess results, when the control flap is in the operative position, in the air/fuel mixture being led to a greater extent to one of the preferably two inlet valves, which favours the swirl formation within the combustion chamber.

In an advantageous embodiment of the invention, several of the control flaps associated with the inlet passages of the individual cylinders are pivoted by means of a common continuous pivot axle, and the control flaps may be of a plastic material and non-rotatably connected to the pivot axle. When the control flaps are made of plastic, it is particularly advantageous that the control flaps have their greatest cross-section in the region of the pivot axle, since sufficient space is thereby provided for a bore which receives the axle, so that the flow-beneficial cross-sectional profile of the control flaps is not affected by the pivot axle. The control flaps may be made so as to be axially displaceable on the pivot axle, in order to compensate for tolerances in the positioning of the individual inlet passages. A preferred manner of achieving this is for the pivot axle and the corresponding bores to have an angular profile which provides security against twisting.

BRIEF DESCRIPTION OF THE DRAWINGS

The invention will now be described in more detail, by way of example, with reference to the drawings, in which.

DETAILED DESCRIPTION OF A PREFERRED EMBODIMENT

Figure 1:
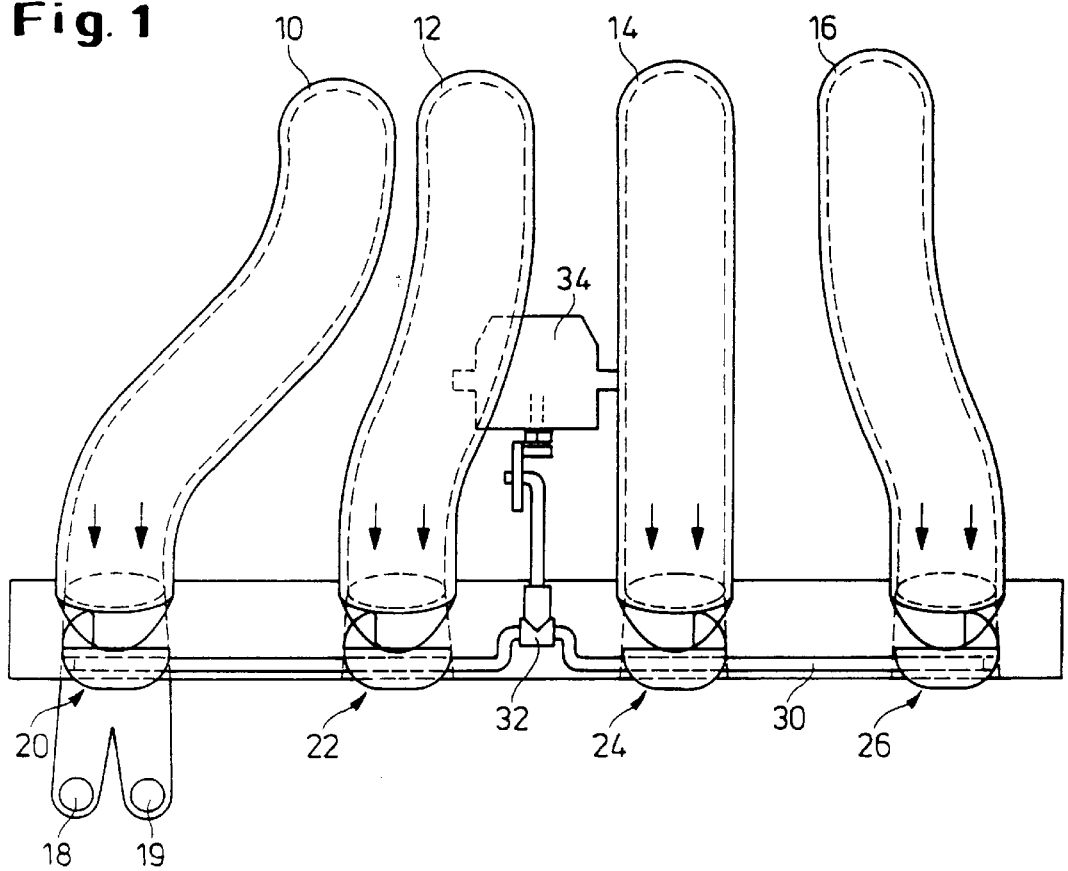
FIG. 1 is a schematic plan view of an inlet arrangement in accordance with the invention.

As shown in FIG. 1, an inlet arrangement of a four-cylinder internal combustion engine includes four inlet passages associated with the individual cylinders and formed in intake manifolds 10, 12, 14, 16 which supply an air/fuel mixture to the combustion chambers of the individual cylinders. The passage cross-section of the inlet manifolds can be partly closed by control flaps 20, 22, 24, 26. Beyond the control flaps (in the direction of flow), each inlet manifold opens into individual inlet passages, each associated with two inlet valves 18, 19, which are only shown schematically for the inlet manifold 10. In a preferred embodiment, the control flaps 20, 22, 24, 26 are pivoted by means of a common, asymmetrically arranged pivot axle 30 by an eccentric 32 and a vacuum actuator 34. The vacuum actuator 34 is controlled by means of a vacuum control valve (not shown) by a control unit which receives as input signals the engine speed and the intake pressure. The control flaps can be pivoted by means of the vacuum actuator 34 into two different positions: at low engine speeds or torques the control flaps are pivoted so that they are transverse to the direction of flow and partly close the internal cross-section of the respective inlet passage. The contour of the control flaps 20, 22, 24, 26 results in swirling, which improves the stability and efficiency of the combustion. At high engine speeds or torque demands, the control flaps are pivoted to be parallel to the direction of flow, into the starting position shown in FIG. 1. In the starting position, the flow conditions in the inlet passage are largely unaffected by the control flaps.

Figure 2:
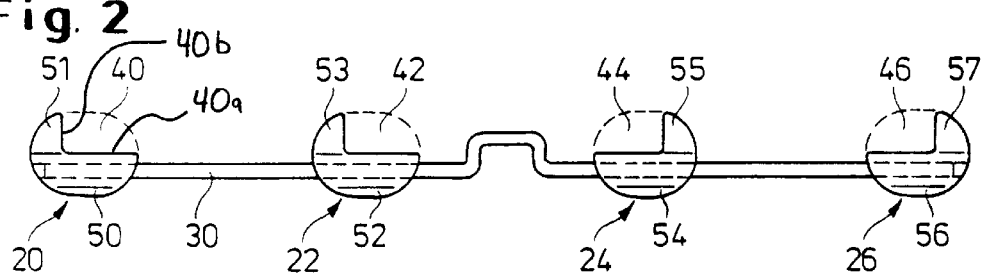
FIG. 2 is a view of the control flap arrangement shown in FIG. 1.

As shown in FIG. 2, the individual control flaps 20, 22, 24, 26 each have two wings 50, 52, 54, 56 and 51, 53, 55, 57 respectively on opposite sides of the pivot axle 30. The pivot axle 30 runs asymmetrically in an opening in the lower region of the respective control flap. The larger-area wings 51, 53, 55, 57 are provided with recesses 40, 42, 44, 46 at their rims. The area of these recesses preferably amounts to about 33% of the base area of the wing. The recesses 40, 42 are preferably arranged on the right hand side, while the recesses 44, 46 are on the left hand side. Preferably, the recess 40, typical of the other recesses 42, 44, 46, has a first edge 40a formed in the direction of the pivot axle and a second edge 40b formed transverse to the pivot axle.

Figure 3:
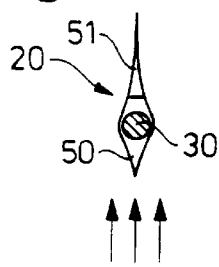
FIG. 3 is a larger-scale view of the cross-sectional profile of a control flap.

As shown in FIG. 3, the control flaps, typical of the shown control flap 20, have a drop-shaped profile. The air/fuel mixture flowing on to the wing 50 is only minimally affected by this flow-suitable form of the control flaps, so long as the control flaps are in the starting position.

Although we have described a preferred embodiment of the invention, it will be apparent to persons skilled in the art that modifications may be made without departing from the scope and the intent of our invention as it is defined by the following claims.

We claim:

1. An inlet arrangement for a multi-cylinder internal combustion engine, each cylinder having an air inlet passage having a length, an internal profile and a pair of inlet valves, the inlet arrangement comprising:

a control flap disposed within the inlet passage of one of the cylinders, the flap being pivotable about a pivot axle, the axle disposed transverse to the length of the inlet passage, the flap having an operative position in which swirling of the air occurs and a starting position, the flap comprises:

a pair of wings, a first one wing of each pair extending on a first side of the pivot axle and the second wing of each pair extending on the opposite side of the axle;

the flap having a base profile substantially corresponding to the internal profile of the inlet passage and a base area; and the first wing having a greater base area than the second wing, the first wing having a recess adjacent to the outer circumference of the wing, the recess facing away from direction from which the air mixture flows when the flap is in the starting position.

2. An inlet arrangement according to claim 1, wherein the first wing has a cross-sectional profile which narrows from the axis toward the outer circumference of the wing.

3. An inlet arrangement according to claim 2, wherein the recess has a cross-sectional area, the recess cross-sectional area being approximately 33% of the base area of the control flap.

4. An inlet arrangement according to claim 2, wherein the recess has a first edge formed in the direction of the pivot axle and a second edge formed transverse to the pivot axle.

5. An inlet arrangement according to claim 3, wherein the recess has a first edge formed in the direction of the pivot axle and a second edge formed transverse to the pivot axle.

6. An inlet arrangement according to claim 2, further comprising a second control flap disposed in a second of the inlet passages, the control flaps being pivoted about a common continuous pivot axle.

7. An inlet arrangement according to claim 6, wherein the control flaps are formed of a plastic material and connected non-rotatably to the pivot axle.

8. An inlet arrangement according to claim 3, further comprising a second control flap disposed in a second of the inlet passages, the control flaps being pivoted about a common continuous pivot axle.

9. An inlet arrangement according to claim 8, wherein the control flaps are formed of a plastic material and connected non-rotatably to the pivot axle.

10. An inlet arrangement according to claim 4, further comprising a second control flap disposed in a second of the inlet passages, the control flaps being pivoted about a common continuous pivot axle.

11. An inlet arrangement according to claim 10, wherein the control flaps are formed of a plastic material and connected non-rotatably to the pivot axle.

12. An inlet arrangement according to claim 5, further comprising a second control flap disposed in a second of the inlet passages, the control flaps being pivoted about a common continuous pivot axle.

13. An inlet arrangement according to claim 12, wherein the control flaps are formed of a plastic material and connected non-rotatably to the pivot axle.

* * * * *